March 24, 1936.  W. SATHER  2,035,023
AUTOMATIC BRAKE ACTUATOR FOR TRAILERS
Original Filed May 9, 1934   3 Sheets-Sheet 1
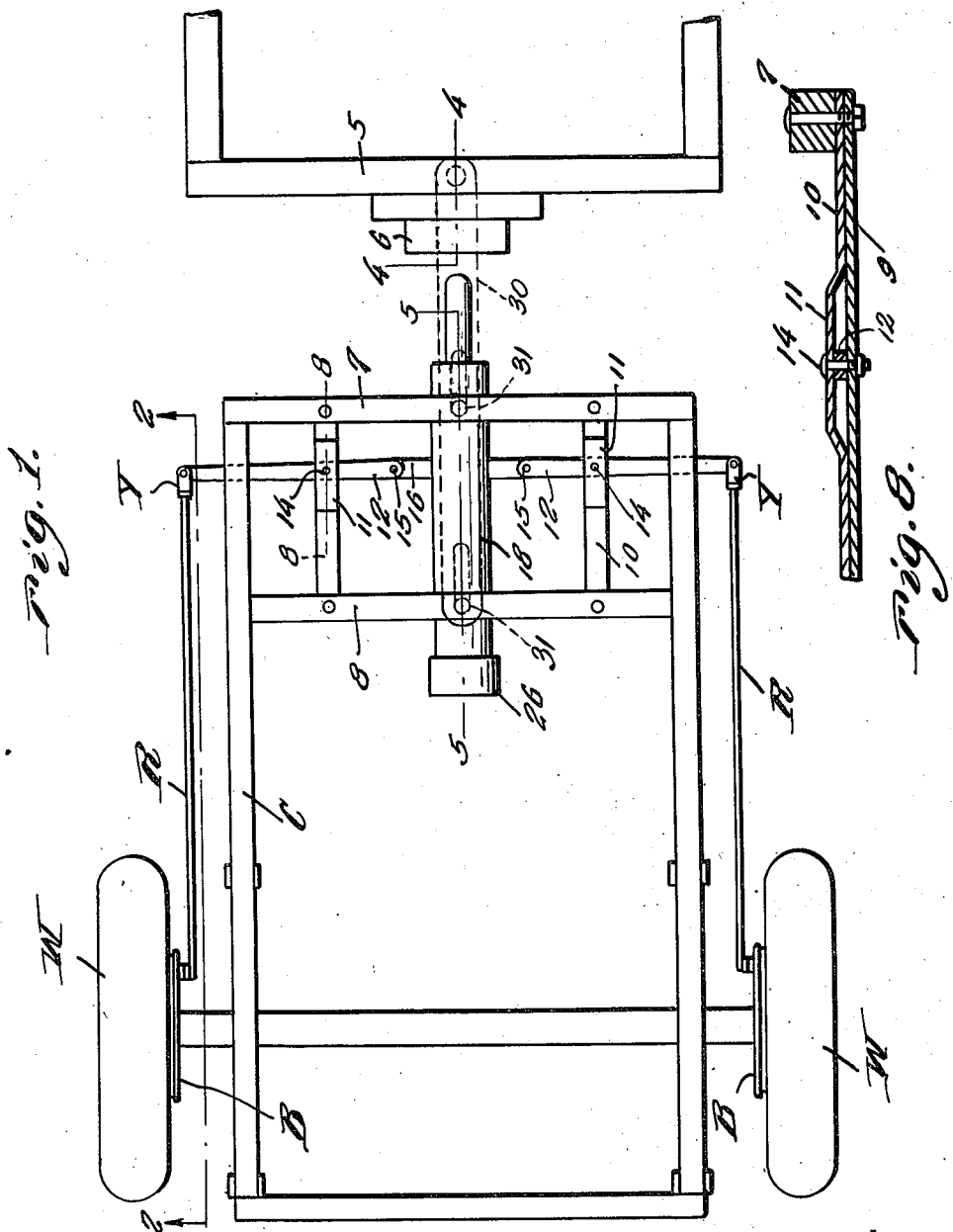
Inventor
William Sather
By Clarence A. O'Brien
Attorney March 24, 1936. W. SATHER 2,035,023
AUTOMATIC BRAKE ACTUATOR FOR TRAILERS
Original Filed May 9, 1934 3 Sheets-Sheet 2
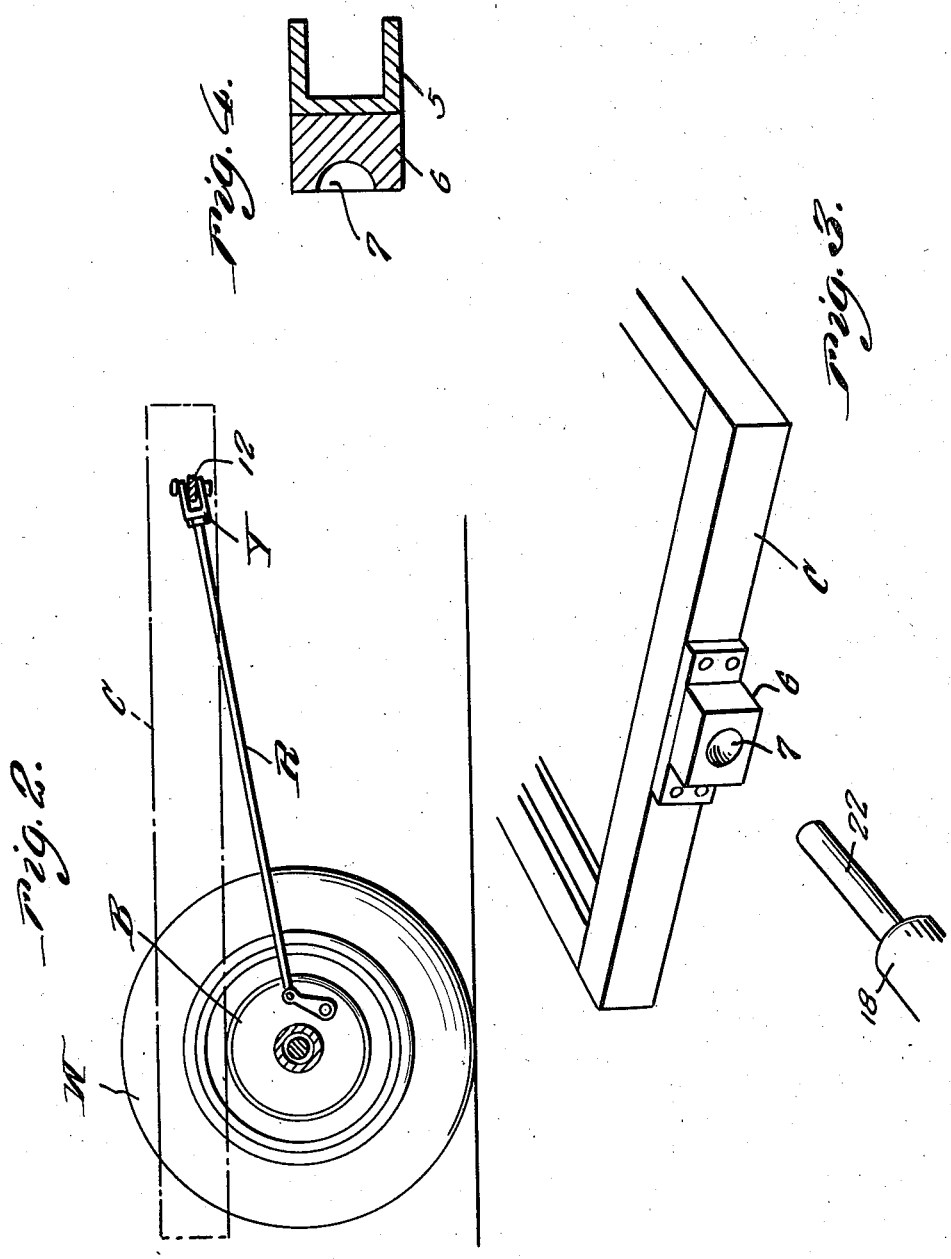
Inventor
William Sather
By Clarence A. O'Brien
Attorney

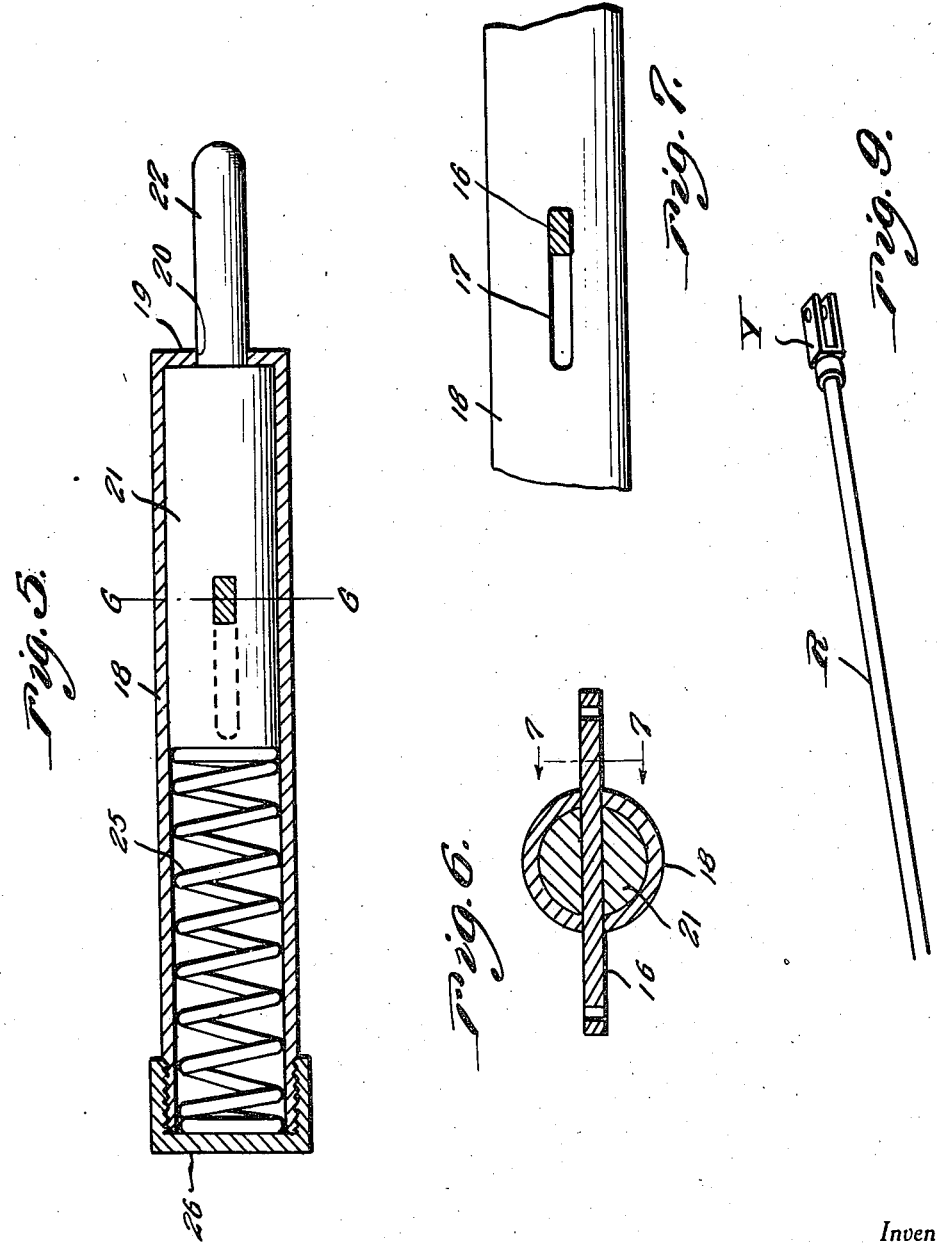

Patented Mar. 24, 1936

2,035,023

UNITED STATES PATENT OFFICE 2,035,023

AUTOMATIC BRAKE ACTUATOR FOR TRAILERS

William Sather, Norman, Okla.

Application May 9, 1934, Serial No. 724,771
Renewed January 22, 1936

1 Claim. (Cl. 188—142)

The present invention relates to trailers such as are used for automobiles, trucks and the like and the object of the invention resides in the provision of an automatic brake actuator for the trailer so that when the towing vehicle decreases in speed and stops the brakes will be automatically applied to the wheels of the trailer.

Another important object of the invention resides in the provision of a mechanism for bringing about automatic brake actuation for the trailer which mechanism is simple in its construction, thoroughly efficient and reliable in use and operation, inexpensive to manufacture and otherwise well adapted for the purpose for which it is designed.

With the above and numerous other objects in view as will appear as the description proceeds, the invention consists in certain novel features of construction, and in the combination and arrangement of parts as will hereinafter be more fully described and claimed.

In the drawings:—

Figure 1 is a top plan view showing the trailer and the rear end of the chassis of the towing vehicle.

Figure 2 is a sectional view taken substantially on the line 2—2 of Figure 1.

Figure 3 is a perspective view showing the rear end of the chassis of the towing vehicle with the block mounted thereon and the rod and rod casing.

Figure 4 is a sectional view taken on the line 4—4 of Figure 1.

Figure 5 is a sectional view taken on the line 5—5 of Figure 1 but leaving out parts of the trailer.

Figure 6 is a detail section taken substantially on the line 6—6 of Figure 5.

Figure 7 is a detail sectional view taken substantially on the line 7—7 of Figure 6.

Figure 8 is a sectional view taken substantially on the line 8—8 of Figure 1.

Figure 9 is a fragmentary perspective view of one of the link rods.

Referring to the drawings in detail it will be seen that the numeral 5 denotes the rear cross bar of a vehicle chassis on which is mounted a block 6 the rear face of which is provided with a recess 7.

The letter C denotes the chassis of a trailer mounted by conventional means on wheels W having brakes B associated therewith in the usual well known manner. These brakes are actuable by link rods R on the forward ends of which are swiveled yokes Y. It will be recognized that outside of the block 6 the parts thus far described are quite conventional.

The numeral 7 denotes the front bar of the chassis C. The numeral 8 denotes the cross bar in the chassis C rearwardly of and adjacent to the bar 7. Two pairs of plates extend between the bars 7 and 8 longitudinally of the trailer, each pair comprising a lower plate 9 and an upper plate 10. An intermediate portion of the upper plate 10 is offset upwardly as at 11. Levers 12 have central longitudinal oblong openings for receiving bolts 14 extending through the offset portion 11 and the plate 9. The inner ends of these levers are pivoted as at 15 to a bar 16. This bar 16 extends through and is movable in slots 17 provided in the sides of a cylindrical casing 18 which is fixedly mounted to the cross bars 7 and 8. The forward end of the casing has a plate closure 19 with a central opening 20. An elongated cylindrical block 21 is slidable in the casing and has a reduced abutment rod 22 extending from its forward end and slidable through the opening 20 and the front end thereof is adapted to be received in the recess 7. The bar 16 extends transversely through an intermediate portion of the cylindrical block 21 and moves therewith. A spring 25 is mounted in the casing and impinges against the rear end of the block 21 and against a cap 26 threaded on the rear end of the casing. The casing is mounted in openings in the cross bars 7 and 8. The yokes Y are pivotally engaged on the outer ends of the lever 12.

It will be readily apparent from the detail description just given that when the towing vehicle slows down and the trailer moves forwardly the bar extension 22 engages in the recess 7 of the block 6 and will cause movement rearwardly of the block 21 in the casing 18 thereby causing the rocking of the levers 12 to apply the brakes.

The trailer can be connected with the vehicle in any suitable manner though Figure 1 shows in dotted lines a draw bar 30 having its front end pivotally connected with the automobile and the said bar is connected with the front portion of the trailer by the pin and slot connections shown generally at 31, this type of connection permitting the trailer to move forwardly toward the automobile, thus permitting the operation of the invention for applying the brakes of the trailer when the plunger strikes the block 6.

It is thought that the construction, operation, utility and advantages of this invention will now be quite apparent to those skilled in this art without a more detailed description thereof. The present embodiment of the invention has been described in considerable detail merely for the purposes of exemplification since in actual practice it attains the features of advantage enumerated as desirable in the statement of the invention and the above description.

Having thus described my invention, what I claim as new is:—

In combination with a vehicle provided with brakes, a longitudinally extending cylinder connected to the front part of the vehicle and having its rear end closed and an opening in its front end, a piston in the cylinder having a reduced front end passing through the opening in the front of the cylinder, said piston being moved rearwardly when the front end of the reduced part strikes an object, a spring in the rear part of the cylinder for normally holding the piston in its forward position, said piston having a lateral hole therein, a bar passing through said hole and the cylinder having longitudinally extending slots in its side walls through which the bar extends, oppositely arranged levers pivoted to the vehicle and having their inner ends pivoted to the ends of the bar, and means for connecting the outer ends of the levers to the brake, whereby rearward movement of the piston will apply the brakes.

WILLIAM SATHER.